Figure 6:
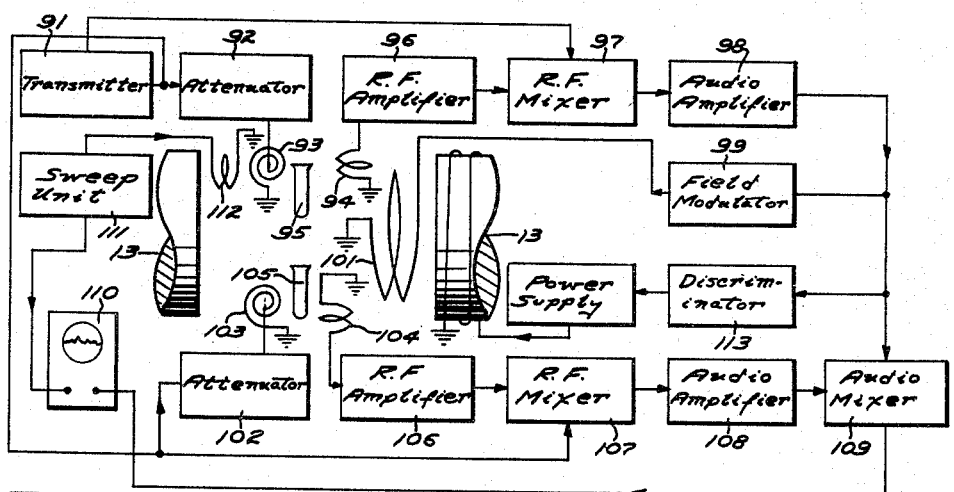

March 9, 1965 W. A. ANDERSON ETAL 3,173,083
GYROMAGNETIC RESONANCE METHOD AND APPARATUS
Filed Feb. 23, 1962 6 Sheets-Sheet 1
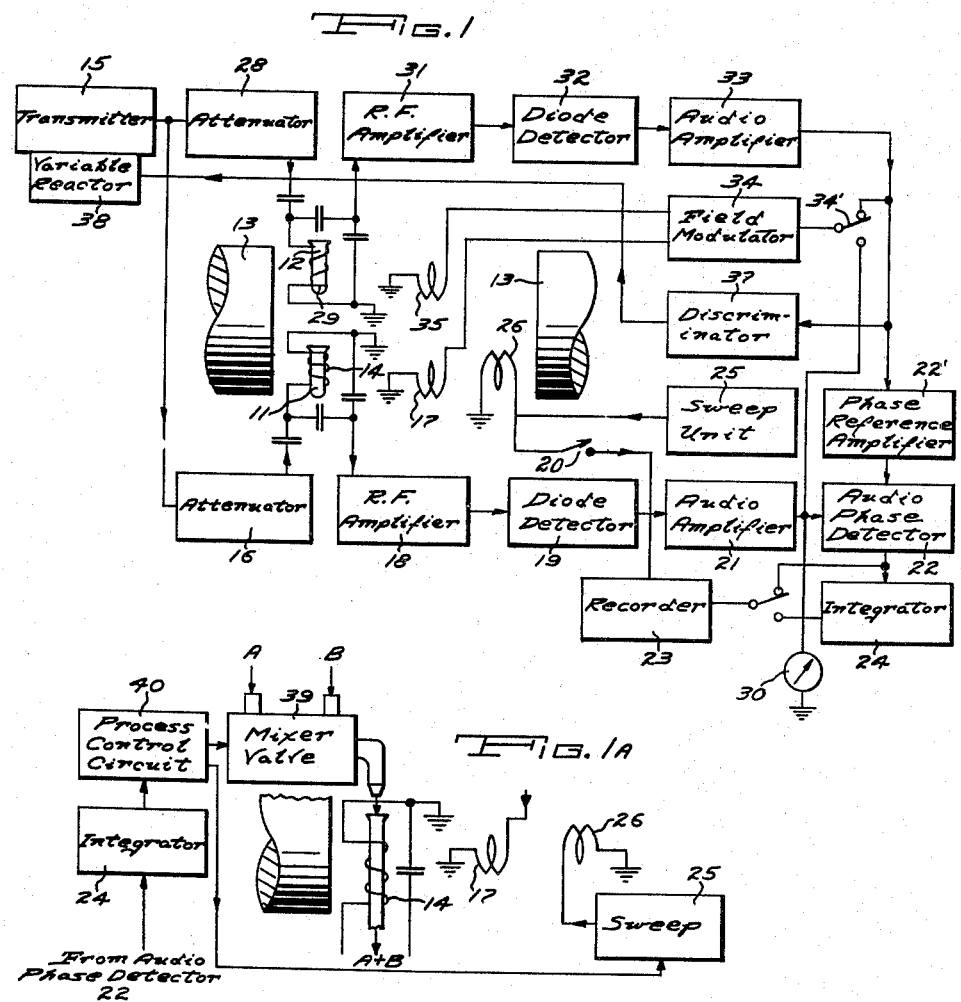
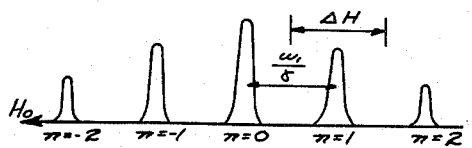
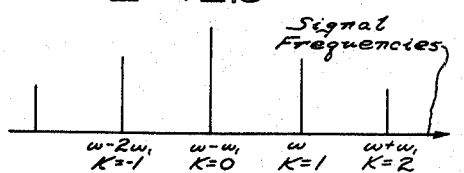
Inventors
Weston A. Anderson
Forrest A. Nelson
David L. Wright
By Wm J Nolan
Attorney

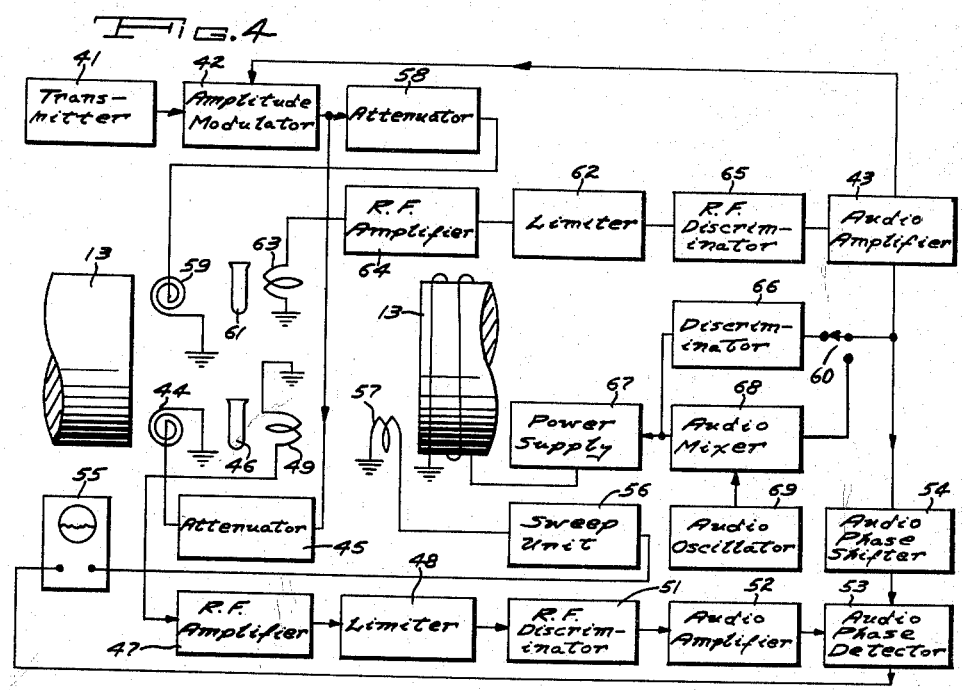
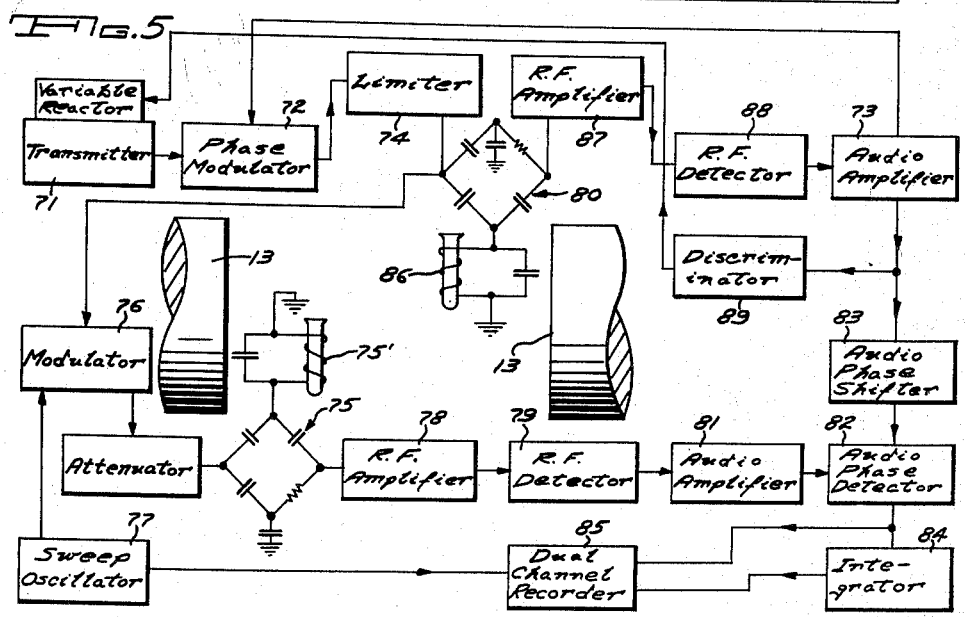

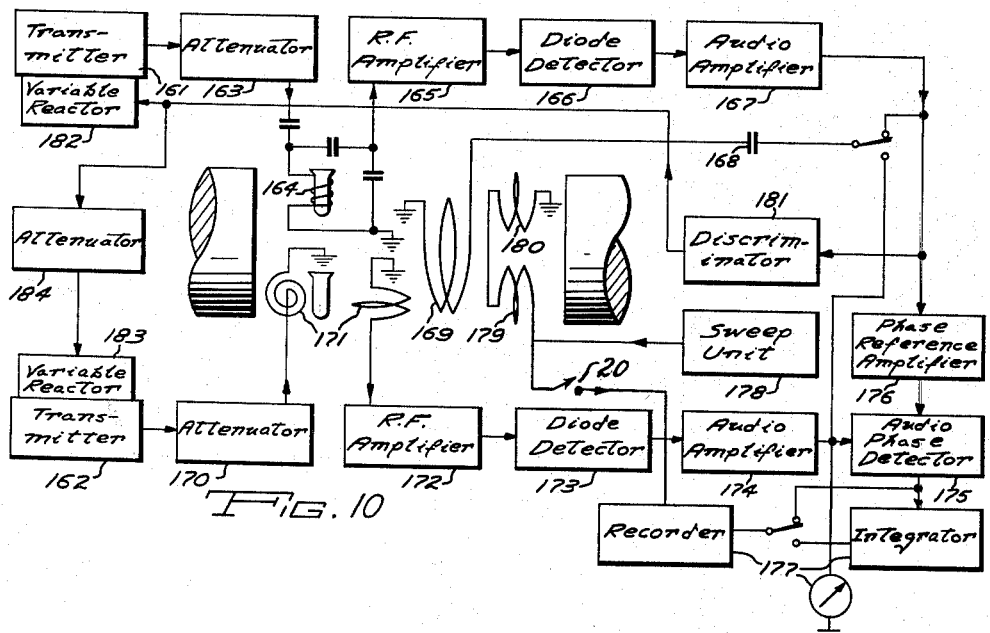
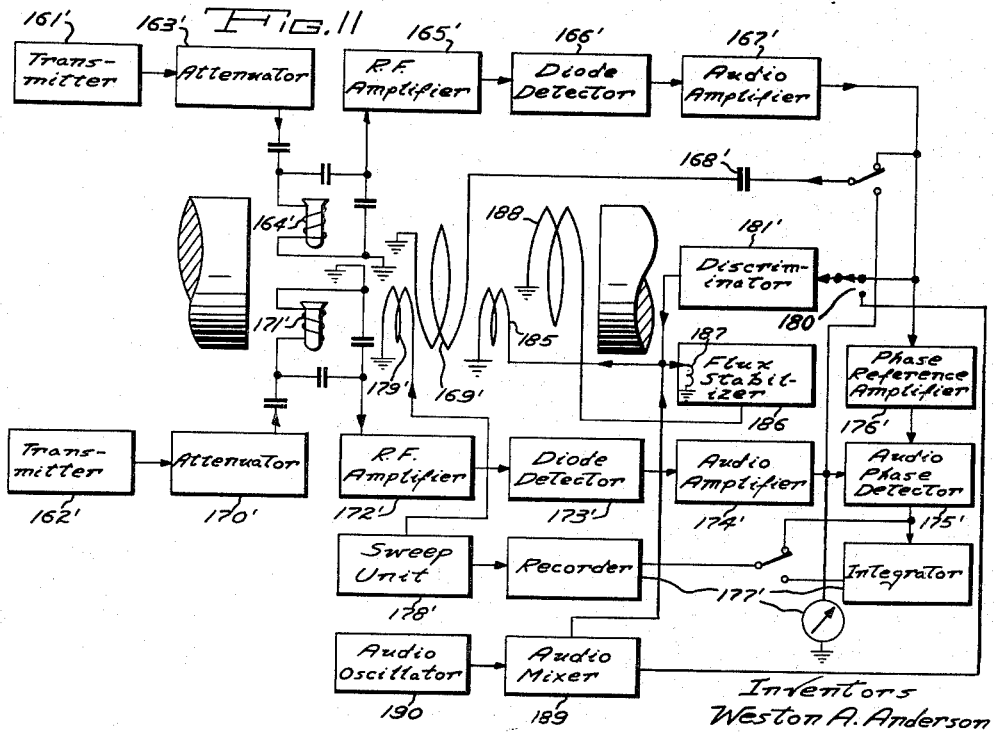

March 9, 1965  W. A. ANDERSON ETAL  3,173,083
GYROMAGNETIC RESONANCE METHOD AND APPARATUS
Filed Feb. 23, 1962  6 Sheets-Sheet 6
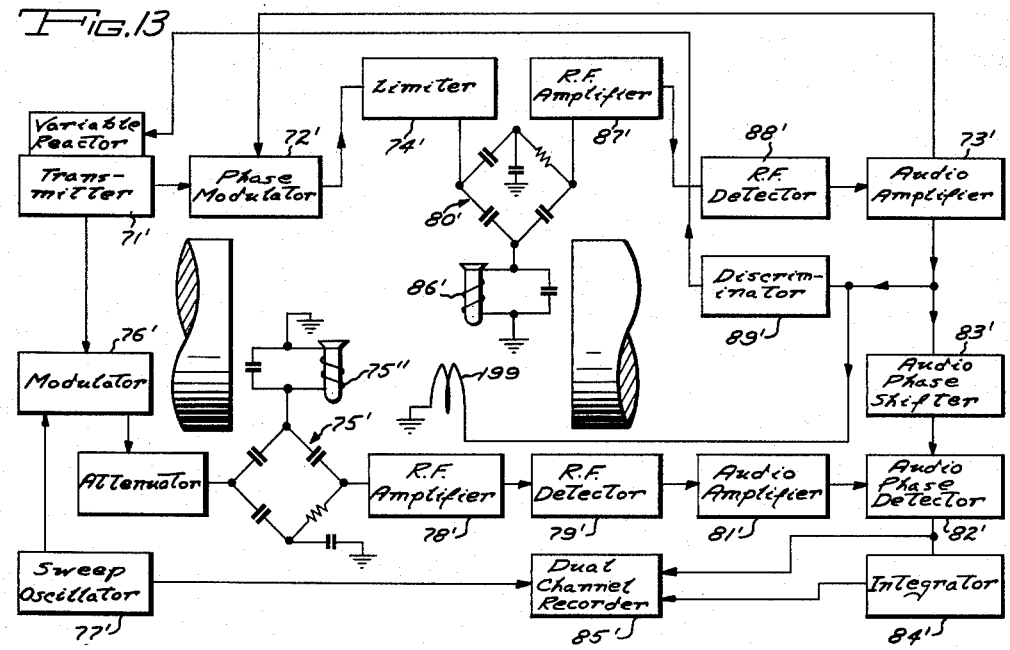
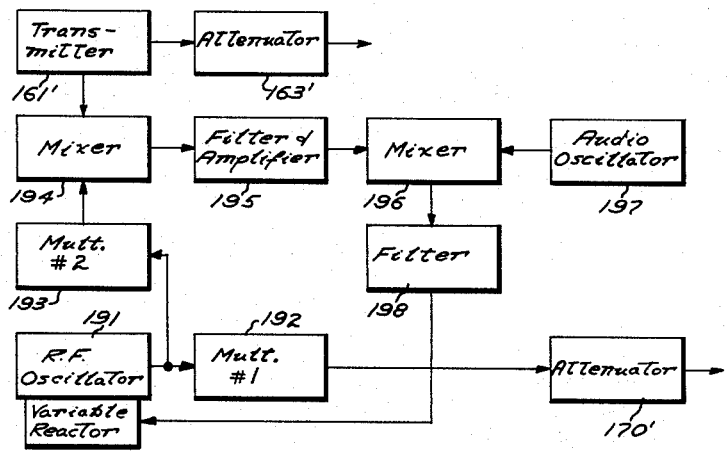
Inventors
Weston A. Anderson
Forrest A. Nelson
David L. Wright
By Wm Nolan
Attorney United States Patent Office 3,173,083
Patented Mar. 9, 1965

3,173,083
GYROMAGNETIC RESONANCE METHOD AND APPARATUS
Weston A. Anderson, Forrest A. Nelson, and David L. Wright, Palo Alto, Calif., assignors to Varian Associates, Palo Alto, Calif., a corporation of California
Filed Feb. 23, 1962, Ser. No. 174,950
31 Claims. (Cl. 324—.5)

This patent application is a continuation-in-part of patent application Serial No. 71,184 entitled "Gyromagnetic Resonance Method and Apparatus," filed on November 23, 1960, by the same inventors, now abandoned in favor of this application.

This invention relates in general to gyromagnetic resonance apparatus and more particularly to novel improved apparatus and methods utilizing side band resonance techniques for producing and detecting gyromagnetic resonance.

The present invention involves the utilization, in gyromagnetic resonance spectrometer systems, of a self-sustaining side band resonance oscillator to control the parameters of the measurement or analysis channels of the spectrometer systems to render them field-frequency stabilized. The invention encompasses gyromagnetic resonance spectrometer systems of the side band resonance type in which the parameters of the measurement channel of the systems are so arranged that side band resonances are produced and, by suitable receiver circuitry, one of these side band resonance signals is observed, the spectometer employing the self-sustaining side band resonance oscillator to produce the modulation signal necessary to produce the side band resonance in the spectrometer measurement channel. The present invention encompasses the use of polarizing magnetic field modulation and transmitter modulation for producing the desired side band resonances in the oscillator and measurement channels of the systems. Such spectrometers are, because of their novel construction, field-frequency stabilized, insensitive to probe unbalance and are much improved over previous systems with regard to zero drift.

It is, therefore, the object of the present invention to provide novel improved gyromagnetic resonance systems utilizing side band resonance techniques.

One feature of the present invention is the provision of novel gyromagnetic resonance spectrometer systems which employ a measurement channel controlled by a side band resonance oscillator channel, the side band resonance being produced by either modulation of the polarizing magnetic field or modulation of the transmitter signal.

Another feature of the present invention is the provision of novel side band resonance gyromagnetic resonance spectrometer systems which employ a side band resonance measurement channel controlled by a side band resonance oscillator channel, the side band resonances in the two channels being produced by either modulation of the polarizing magnetic field or modulation of the transmitter signal.

Another feature of the present invention is the provision of novel systems of the above featured types wherein the side band oscillator controls the magnetic field strength or radio frequency of the measurement channel in accordance with the oscillation frequency of the oscillator.

Still another feature of the present invention is the provision of novel systems of the above featured types wherein a sweep through the resonance spectrum is produced by a sweep of the magnetic field of the oscillator or measurement channels or a sweep of the transmitter frequency.

Figure 7:
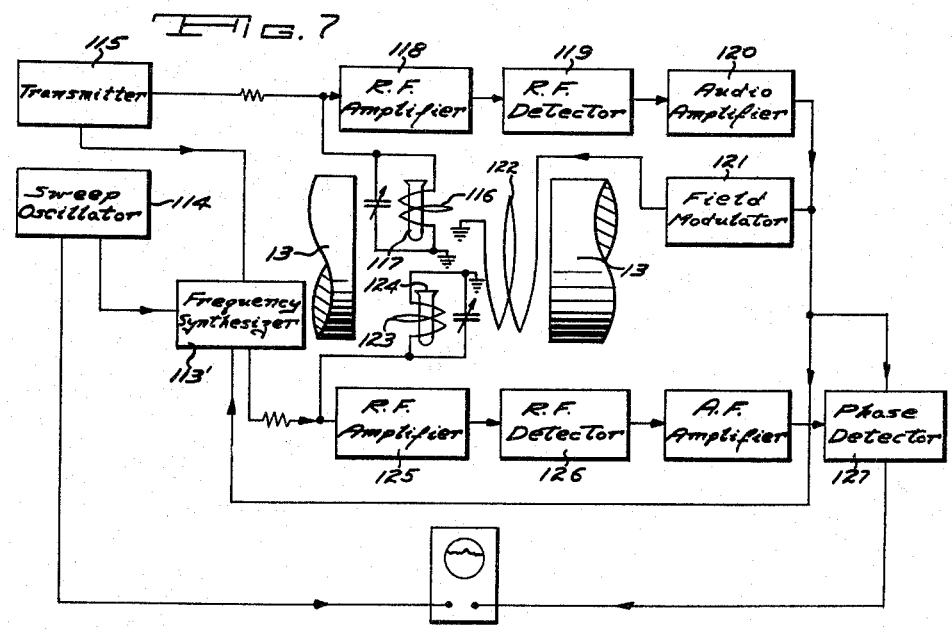
Figure 8:
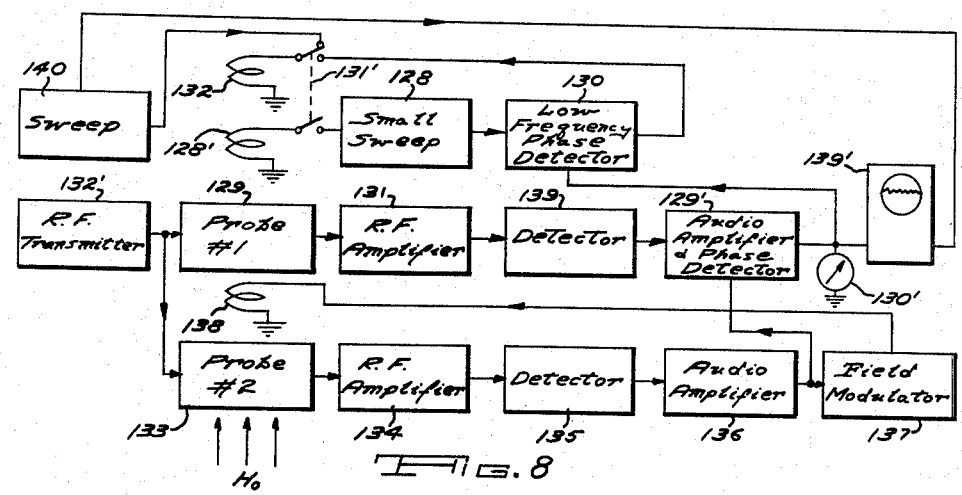
Figure 9:
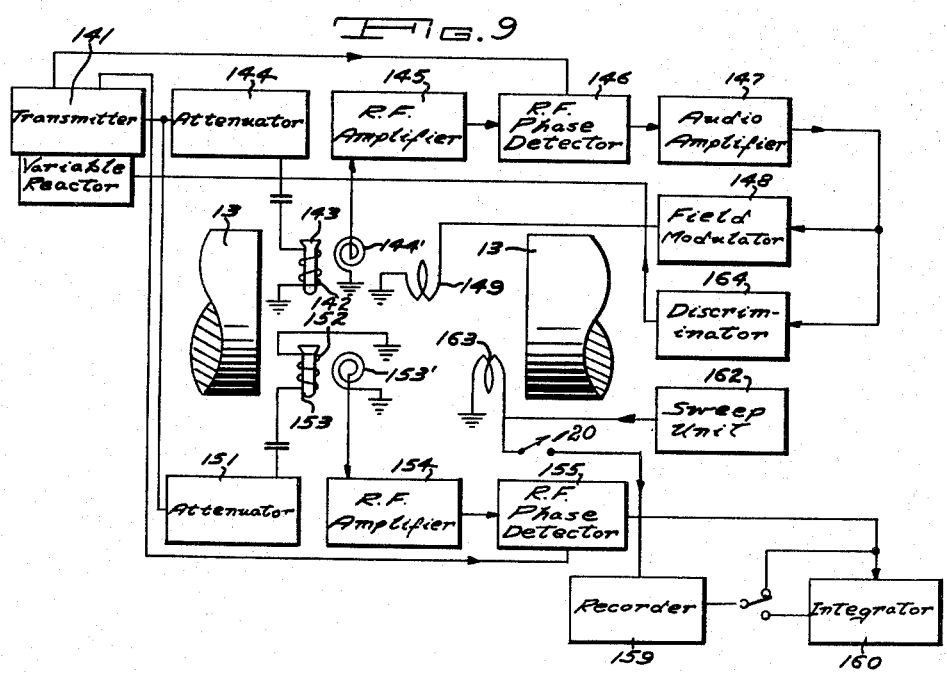

These and other features and advantages of the present invention will become more apparent upon a perusal of the following specification taken in connection with the accompanying drawings wherein, FIG. 1 is a block diagram showing a side band resonance gyromagnetic resonance spectrometer system employing a side band resonance oscillator for field-frequency stability in which self-sustaining audio modulation of the polarizing magnetic field is utilized to produce the side band resonance in both the measurement and oscillator channels, the system being a single coil type of resonance system, FIG. 1A shows a modification made to the system of the type shown in FIG. 1 for process control applications, FIG. 2 is a graphical illustration of the resonance signals obtained at certain values of field from a system of the type shown in FIG. 1, FIG. 3 is a graphical illustration showing the frequency components of one of the side band resonance signals of the type shown in FIG. 2, FIG. 4 is a block diagram of a side band resonance spectrometer system employing a side band resonance oscillator for field-frequency stability in which the transmitter section of the system is amplitude modulated to produce the side band resonance condition while the receiver sections of the measuring and oscillator channels are sensitive to frequency modulation for detecting such resonance, the system being a crossed-coils type of system, FIG. 5 is a block diagram of a side band resonance type gyromagnetic resonance spectrometer system employing a side band resonance oscillator for field-frequency stability in which the transmitter section is frequency modulated to produce a side band resonance and the receiver sections of the measuring and oscillator channels are sensitive to amplitude modulation for detecting the resonance condition in the side band, the system being a single coil type of system, FIG. 6 is a block diagram of another type of gyromagnetic resonance spectrometer system utilizing a side band resonance oscillator for field-frequency stability, FIG. 7 is a block diagram of a system incorporating the present invention wherein the samples in the oscillator and the measuring channels have different gyromagnetic ratios, FIG. 8 is a block diagram of a spectometer system incorporating the present invention which also employs a novel method and means for automatically sweeping across a line in the spectrum to optimize magnetic field adjustments, FIG. 9 is a block diagram of a more conventional spectrometer system than those shown above which also employs a gyromagnetic resonance side band oscillator for control of the measurement channel of the system, FIG. 10 is a block diagram of a spectrometer system of the present invention which is arranged to analyze a sample having a different gyromagnetic ratio than the oscillator sample, FIG. 11 shows a block diagram of another embodiment of the present invetnion for use with samples having different gyromagnetic ratios, FIG. 12 illustrates a possible modification of the spectrometer system of FIG. 11, and FIG. 13 is a block diagram of another embodiment of the invention in which the oscillator channel employs frequency modulation and the spectrometer channel employs magnetic field modulation.

Referring now to FIG. 1 there is shown in block diagram form a single coil form of gyromagnetic resonance spectroscopy system embodying the present invention. The chemical sample 11 to be analyzed by means of gyromagnetic resonance, for example, resonance of the nuclear magnetic moments of the sample, and the sample or substance 12 utilized in the side band resonance oscillator are placed in the strong unidirectional magnetic field $H_0$ in the gap of a permanent magnet or electromagnet represented by pole pieces 13. An R.F. coil 14 is located in close coupling relationship to the sample 11 with its axis substantially perpendicular to the unidirectional magnetic field $H_0$. A radio frequency transmitter 15, such as a crystal controlled oscillator, is coupled to the coil 14 (through an attenuator circuit 16, if desired) and supplies a radio frequency driving field $H_1$ to the sample 11 at an angular frequency $\omega$ to produce the desired nuclear magnetic resonance in the sample 11 in a manner well known in the art, side band resonance being produced in a manner described below. At or near resonance of the nuclear magnetic moments in the sample 11 the coil 14 has induced therein a signal due to the resonance condition of the nuclei at the frequency $\omega$.

The unidirectional magnetic field $H_0$ is modulated by an audio or low frequency (for example, 1 kc. to 100 kc.) magnetic field $H_m$ from the audio or low frequency modulation coil 17 coupled to the nuclear side band oscillator channel (to be subsequently described) at an audio or low frequency $\omega_1$, the amplitude of the unidirectional magnetic field $H_0$ thus being modulated at the audio frequency rate to give a total field $H_z = H_0 + H_m \cos(\omega_1 t + \phi)$.

To determine the effects of field modulation consider a special solution of the phenomenological equations in the Physical Review article, vol. 70, pages 460–74, 1946 by Felix Bloch. If we let $m = M_x + iM_y$, $h = \gamma(H_x + iH_y)$ and $\omega_A \gamma H_z$ the equations may be written in the following form (1) $$\frac{dm}{dt} + i\omega_A m - ihM_z + \frac{m}{T_2} = 0$$

(2) $$\frac{dM_z}{dt} + I_m(mh^*) + \frac{M_z}{T_1} = \frac{M_0}{T_1}$$

where $I_m$ denotes the imaginary component and * denotes the complex conjugate.

The oscillation radio frequency field along the $x$-axis may be decomposed into two counter-rotating fields. Since only the rotating field which rotates in the same direction as the Larmor precession is effective in stimulating transitions (see the Bloch-Siegert paper, Physical Review, vol. 57, 1940, page 522) only this component needs to be used in the analysis. If the applied R.F. field is sufficiently small, one may replace $M_z$ by $M_0$ and neglect Equation 2. With $m = m_1 e^{-i\omega t}$ and $h = h_1 e^{-i\omega t}$ Equation 1 becomes (3) $$\frac{dm_1}{dt} + i(\omega_A - \omega)m_1 + \frac{m_1}{T_2} = ih_1 M_0$$

The field modulation has the form $$H_z = H_0 + H_m \cos \omega_1 t$$

which is equivalent to $\omega_A = \omega_0 + \gamma H_m \cos \omega_1 t$ where $$\omega_0 = \gamma H_0$$

and let $\Delta\omega = \omega_0 - \omega$.
With the above substitutions the differential Equation 3 has the solution $$m_1 = ih_1 M_0 \int_{-\infty}^{t'} \exp \int_{t}^{t'} \left\{ \frac{1}{T_2} + i\Delta\omega + i\gamma H_m \cos \omega_1 t'' \right\} dt'' dt'$$

If the variation of $\Delta\omega$ is sufficiently slow, one obtains (4)
$$m_1 = ih_1 M_0 \int_{-\infty}^{t} \left[ \exp\left\{\left(\frac{1}{T_2} - i\Delta\omega\right)(t'-t) + i\beta \sin \omega_1 t' - i\beta \sin \omega_1 t\right\}\right] dt$$

with $$\beta = \frac{\gamma H_m}{\omega_1}$$

This equation may be integrated with the help of the identity $$\exp\{i\beta \sin \omega_1 t\} = \sum_{n=-\infty}^{\infty} J_n(\beta) \exp(in\omega_1 t)$$

where $J_n(\beta)$ are Bessel functions of the first kind. Upon integrating one obtains (5)
$$m_1 = ih_1 T_2 M_0 \sum_{k=-\infty}^{\infty} \sum_{n=-\infty}^{\infty} \frac{J_k(\beta) J_n(\beta) \exp\{-i(k-n)\omega_1 t\}}{1 + i(\Delta\omega + n\omega_1)T_2}$$

The quantity $m_1$ is just the magnetization in the rotating coordinate system and thus it is a measure of the signal $u + iv$ which one obtains after mixing the signal voltage with the R.F. reference voltage. This analysis shows that the resonance condition is not only fulfilled by the equation $\omega = \gamma H_0$ but also a series of additional side band resonances are obtained, each resonance separated from the adjacent resonance by $$\frac{\omega_1}{\gamma}$$

in magnetic field units. These resonances are indicated diagrammatically in FIG. 2. Here each separate resonance corresponds to a different value of $n$ in Equation 5. If we now select a given resonance signal, $n$, and Fourier analyze the frequencies present in the signal, we find all frequencies of the form $\omega + (k-n)\omega_1$ to be present where $k$ is a positive or negative integer. This is shown diagrammatically in FIG. 3 where the frequencies present for the $n = 1$ side band are represented; similar separate frequencies exist for the other values of $n = 0$, $-1$, $\pm 2$, etc. In the present illustration, the parameters of the system are selected such that the region represented by $\Delta H$ is slowly swept through to produce this $n = 1$ side band resonance.

Thus, the total signal in the R.F. coil transmitted to the R.F. amplifier 18 includes a leakage signal at the transmitter frequency $\omega$ which is modulated by a nuclear resonance signal from the nuclear magnetic moments with a frequency component $\omega$ as well as components at all frequencies which differ from $\omega$ by an amount $\omega_1$, $2\omega_1$, $3\omega_1$, .... This modulated R.F. signal is amplified by the radio frequency amplifier 18 and fed to a diode detector circuit 19 which operates to demodulate the signal and produce an output signal at the low or audio frequency $\omega_1$.

This $\omega_1$ output is fed to an audio amplifier 21 for amplification and then to an audio mixer or phase detector circuit 22 which obtains its reference frequency $\omega_1$ directly from the side band oscillator channel through a phase reference amplifier 22'. The output of this mixer 22 contains a D.C. leakage free signal which is suitable for observation on an oscilloscope or for recording on a graphic recorder 23 or the like or for integration in integrator 24 before recording. The unidirectional magnetic field $H_0$ may be slowly swept through resonance as in a manner utilized in previous gyromagnetic resonance spectrometers, for example, by a saw-tooth sweep generator 25 and sweep coil 26, the output of the sweep generator also being connected through switch 20 to synchronize the recorder 23 when necessary. When it is desired to regulate the polarizing field strength at one sample relative to the field strength at the other sample, a small bias field may be supplied to one or the other of the samples, for example, by supplying an adjustable D.C. current through the sweep coil 26 from a control circuit in the power supply.

Although the component $\omega_1$ has been selected in the above example as the resonance signal component to be observed, it is obvious that, if desired, other components of the resonance signal can be selected by the use of the proper frequency selective circuits in the diode detector.

It should also be mentioned that the mode selection of the resonance signal, that is, dispersion mode or absorption mode, may be made by means of controlling the phase of the leakage voltage on the diode detector 19 or by adjusting the phase of the audio reference voltage fed into 22.

The side band oscillator utilized to provide the audio or low frequency modulating signal to the substance 11 comprises the transmitter 15 coupled (through an attenuator circuit 28, if desired) to the radio frequency coil 29 surrounding the substance 12 to produce a driving radio frequency field $H_1$ at an angular frequency $\omega$ at the substance. The coil 29 is coupled to the receiver and feedback section of the side band oscillator including a radio frequency amplifier 31, diode detector 32, audio amplifier 33, compensation circuit 34 and field modulation coil 35 which modulates the polarizing magnetic field $H_0$ at the substance 12 to produce the desired side band resonance signal from the substance. The side band resonance signal from the substance 12 and the leakage signal from the transmitter 15 will be amplified in amplifier 31 and demodulated in the diode detector to produce an audio or low frequency signal output $\omega_1$ which is amplified in the audio amplifier 33 and transmitted through the compensation circuit to the modulation coil 35. This side band oscillator is a self-excited oscillator in which the frequency of the audio or low frequency feedback signal varies with and is determined by the strength of the unidirectional magnetic field $H_0$ and the frequency $\omega$ in accordance with the general relationship $\omega_1 = /\gamma H_0 - \omega/$. Oscillations at $\omega_1$ are initiated in the same manner as in feedback oscillators in general, i.e., noise energy at the proper frequencies initiates the oscillations which are fed back and build up until equilibrium is established. The range of field-frequency over which this system will operate is determined in part by the audio or low frequency bandwidth of the amplifier 33 and modulation coil 35. The output from the audio amplifier 33 may be coupled directly to the coils 17 and 35 without the need of passing through any form of compensation circuit 34. However, to improve the exact reproducibility characteristics of the system on repeated runs of the spectrometer on the same sample, a compensation circuit 34 is desirable to hold the amplitude of the side band resonance signal substantially constant over the audio or low frequency band by compensating the amplitude of the current being fed to the sweep coil 35 as a function of the audio or low frequency or, in other words, to compensate for the lowering of the modulation index as the low frequency increases. To obtain the desired increase in signal amplitude as the audio frequency increases and vice versa, the compensation network may consist of a series capacitor in the line between the amplifier 33 and the field modulation coils 17, 35, the impedance of which decreases with frequency increase (see, for example, condenser 168 in FIG. 10). In order to prevent saturation of the sample and insure stability of the system, it may be desirable to include a limiter or automatic gain control circuit in the compensation circuit. For proper phase of the feedback signal, a phase shifter circuit may be included in the feedback path if necessary, for example, in the compensation circuitry. One form of compensation circuitry is disclosed and claimed in United States patent application, Serial No. 131,414, entitled "Gyromagnetic Resonance Apparatus," filed August 14, 1961, by David E. Gielow and David L. Wright and now Patent No. 3,127,556 granted March 31, 1964. It is also possible to provide automatic gain control of amplifiers 31 and 18 and prevent gain variations therein from affecting the detected signal amplitude.

Side-band resonance oscillators are described and claimed in copending patent application Serial No. 191,356, filed April 30, 1962 in the name of Weston A. Anderson, said application being a continuation-in-part of Serial No. 57,793, filed September 22, 1960, now abandoned, which was in turn a continuation-in-part of Serial No. 767,654, filed October 16, 1958, now Patent No. 3,147,428 issued September 1, 1964.

This spectrometer also incorporates transmitter control in that the audio frequency signal output from the audio amplifier 33 is transmitted to an audio discriminator circuit 37 as well as to the field modulating coils 17 and 35. The audio discriminator 37 produces a D.C. output signal having an amplitude proportional to the variation in the frequency $\omega_1$ from a normal value. This variable amplitude D.C. signal is utilized to operate a control circuit such as a variable reactor 38 in the transmitter to vary the frequency $\omega$ in a manner to compensate for drift of the field $H_0$ or frequency $\omega$. In place of the discriminator 37, a phase detector circuit and reference oscillator may be utilized (as in FIG. 4). It is also obvious to those skilled in the art that the error signal output from the audio discriminator 37 could be utilized to control the $H_0$ field strength (as in FIG. 4) rather than the frequency of the radio frequency oscillator 15 for the same purpose; also, both the transmitter and the $H_0$ field strength could be controlled simultaneously.

This system is also provided with means for converting the measurement channel into a side band resonance oscillator such that initial adjustments may be conveniently made to the measurement channel and magnetic field parameters to provide optimum signal output from the spectrometer during subsequent sample investigation. A switch 34′ is provided so that the modulating coils may be switched from the output of the audio amplifier 33 to the output from the audio amplifier 21. The measurement channel including the sample 11 is thus converted into a side band resonance oscillator and, by observing the amplitude of the audio signal output as by means of an audio or low frequency voltmeter 30, the magnetic field enveloping the sample 11 may be adjusted and shimmed to obtain optimum oscillator signal output. After such system optimizing, switch 34′ may be operated to reconnect the field modulating coils to the audio amplifier 33 so that an analysis may be made of the sample 11. This conversion feature may be utilized in the system to be subsequently described when appropriate.

It will, of course, be evident to those skilled in this art that side band resonance signals other than the one selected for illustration purposes, i.e., $n=1$, may be utilized in carrying out the present invention. For example, the $n=-1$ sideband resonance lends itself to the use of the identical system described above provided the proper 180° phase shift is introduced in the control channel.

An example of a side band resonance spectrometer of the type shown in FIG. 1 has been built for high resolution proton studies. The transmitter 15 included a crystal controlled oscillator operating at a frequency $$\frac{\omega}{2\pi}$$

of 60 megacycles, which was controlled over a narrow frequency range by the output discriminator 37, and the associated electromagnet 13 produced a field $H_0$ of approximately 14,092 gauss. The bandpass of the side band resonance oscillator channel was sufficient to permit the control channel to lock in over a range of about 4 to 6 kc. Actually the field $H_0$-frequency $\omega$ relationship was set to give a nominal value of modulation frequency $\omega_1$ of 5 kc. This particular spectrometer system was "tuned" to operation on the upper sideband ($n=1$). The sweep unit 25 provided various sweep rates from 25 to 500 seconds with amplitudes of 12 to 250 milligauss. A well known sample spinner was utilized in the spectrometer channel.

Referring to FIG. 1A there is shown certain apparatus which may be substituted into the spectrometer of FIG. 1 in order to adapt the side band resonance spectrometer shown therein to a process control type of instrument. The sample under investigation, rather than being a single substance placed within the radio frequency coil 14, is a mixture made up of substances represented by arrows A and B running through a mixer valve 39 and then passing or flowing through the dielectric conduit enclosed by the radio frequency coil 14. The spectrometer operates in a manner described above and the signal output from the integrator 24 is transmitted to a process control circuit 40 which automatically controls the mixing of the substances A and B in the mixer valve 39 in accordance with the integrated signal obtained from the spectrometer circuitry. In this way a rapid analysis of the mixture is obtained and the signal output utilized to control the ratio of the substances in the mix in a continuous manner.

There are other methods of producing the side band resonances which may be used in place of the above-described magnetic field modulated system. In one such system, the transmitter signal is frequency modulated while the receiver and feedback section of the system utilizes amplitude modulation detection (FM-AM system). In another such system, the transmitter signal is amplitude modulated while the receiver and feedback section of the system utilizes frequency modulation detection of the resonance signal (AM-FM system).

To obtain the results for AM-FM and FM-AM systems, one may consider separately the R.F. fields seen by the nuclei. For each different Fourier component we may assume that the usual slow passage solution of the phenomenological equations is valid and then add the individual solutions below. This method is perfectly valid so long as the separate side band spacings are large compared to the natural linewidths.

Referring now to FIG. 4, there is shown another embodiment of the present invention wherein both the side band resonance measurement channel and the side band resonance oscillator channel employ amplitude modulation of the radio frequency transmitter signal to produce the modulation of the oscillator substance and the substance being measured for obtaining the side band resonances desired. This system also utilizes the crossed-coil type of probe for both the oscillator and measurement channels although it will be understood by those skilled in the art that the choice of single coil or crossed coil probes, or one of each type in the two channels, is a matter of individual preference.

The radio frequency signal $\omega$ from the R.F. transmitter 41 is transmitted to an amplitude modulator 42 which receives an audio modulating signal at frequency $\omega_1$ from the audio amplifier 43 of the side band oscillator to be subsequently described. The signal output from the amplitude modulator 42 to the R.F. transmitter coil 44 (through attenuator 45, if desired) contains $\omega$, $\omega + \omega_1$, and $\omega - \omega_1$. The system parameters are selected such that resonance occurs in the sample 46 at one of the side band frequencies, for example, $\omega + \omega_1$. The signal into the probe is $(1 - M \sin \omega_1 t) \sin \omega t$ where $M =$ index of modulation. The signal into the R.F. amplifier 47 and limiter 48 from the receiver coil 49 during upper side band resonance is then given by $$\sin \omega t + (1 + \epsilon v)\frac{M}{2} \cos (\omega + \omega_1)t + \epsilon u \frac{M}{2} \sin (\omega + \omega_1)t +$$

$$\frac{M}{2} \cos (\omega - \omega_1 t) = \alpha(t) \sin [\omega t + \theta(t)]$$

where $$\alpha^2 = \left[1 + M\left(1 - \frac{\epsilon v}{2}\right) \sin \omega_1 t + \frac{M}{2} \epsilon u \cos \omega_1 t\right]^2 + \left[\frac{M}{2}(\epsilon v \cos \omega_1 t + \epsilon u \sin \omega_1 t)^2\right]$$

and $$\tan \theta = \frac{\frac{M}{2}(\epsilon v \cos \omega_1 t + \epsilon u \sin \omega_1 t)}{1 + M \sin \omega_1 t - \frac{M}{2}(\epsilon v \sin \omega_1 t - \epsilon u \cos \omega_1 t)}$$

and $\epsilon u$ is the $u$ signal and $\epsilon v$ is the $v$ signal.

Under normal conditions $\epsilon \mu, \epsilon v \ll 1$ thus $\theta \ll 1$, we expand $$\theta = \frac{M}{2} \frac{(\epsilon v \cos \omega_1 t + \epsilon u \sin \omega_1 t)}{1 + M \sin \omega_1 t}$$

In passing the R.F. signal through the limiter we fix $\alpha$ and leave $\theta$ unchanged.

We now Fourier analyze $\theta$. For $M \ll 1$ this is simply $$\theta = \frac{M}{2} \epsilon u \sin \omega_1 t + \frac{M}{2} \epsilon v \cos \omega_1 t$$

Thus with an audio phase detector one may select either the $u$ or $v$ mode signal.

Expressed in another way, if there is no resonance taking place in the sample, the output of the radio frequency amplifier 47 and limiter 48 contains only $\omega$ because the limiter removes all amplitude modulation from the $\omega$ signal. If resonance is occurring, however, the signal into the limiter contains both amplitude and frequency modulation of the carrier $\omega$. The limiter removes the amplitude modulation and passes the frequency modulation and, thus, the output of the limiter is a frequency modulated carrier whose phase varies in accordance with the resonance signal. The output from the R.F. amplifier and limiter is passed to an R.F. discriminator 51, the output of which is an audio signal at frequency $\omega_1$ which varies in amplitude with resonance. This output is transmitted through an audio amplifier 52 to an audio mixer circuit 53 where either the $u$ or $v$ mode component may be selected by the choice of the phase, by means of the phase shifter 54, of the audio reference voltage from the audio amplifier 43 of the side band oscillator. The D.C. output signal of this system is then transmitted to the oscilloscope 55 which receives its slow horizontal sweep signal from the sweep generator 56 which is utilized with sweep coil 57 to sweep through the spectrum.

In the side band oscillator channel, the amplitude modulated signal is transmitted from the amplitude modulator 42 (through an attenuator circuit 58, if desired) to the transmitter coil 59.

As explained above, with resonance occurring in the oscillator substance 61, the signal into the limiter 62 from the pick-up coil 63 and R.F. amplifier 64 contains both amplitude and frequency modulation of the carrier $\omega$. The limiter 62 removes the amplitude modulation and passes the frequency modulation and, thus, the output of the limiter is a frequency modulated carrier whose phase varies in accordance with the resonance signal. The output from the limiter 62 is passed to an R.F. discriminator 65, the output of which is an audio signal at frequency $\omega_1$ which varies in amplitude with resonance. This output is transmitted through the audio amplifier 43 back to the amplitude modulator 42 to thereby provide a closed loop feedback circuit for sustaining oscillation of the system. The phase of the audio signal may be adjusted by the parameters of the audio amplifier 43, if desired. This system gives both radio frequency and audio frequency gain with the advantage of not requiring large amplification at high frequencies. In addition, this system is not sensitive to changes in radio frequency gain.

The side band oscillator signal is also utilized for field control in that the output from the audio amplifier 43 is transmitted through the break contacts of switch 60 to a discriminator 66 which produces a D.C. output signal as described above with regard to FIG. 1 to control the electromagnet power supply 67. In lieu of the discriminator 66, an audio mixer 68 and reference audio oscillator 69 could be utilized by opening the break contacts and closing the make contacts of switch 60. The frequency of transmitter 41 could be controlled rather than the polarizing field or both could be controlled, if desired.

In FIG. 5, there is shown a block diagram of another side band resonance gyromagnetic resonance spectrometer system employing a side band oscillator. In this system the radio frequency driving signals for both the oscillator and measurement channels are frequency modulated at the audio rate and the sytsem employs a bridge type probe although this frequency modulation scheme is equally applicable to crossed-coils systems and other single coil systems. The radio frequency transmitter 71 generates a signal of frequency $\omega$ which is coupled to a phase modulator circuit 72 which is also coupled to the audio amplifier 73 of the side band resonance oscillator from which the phase modulator receives a modulating signal of frequency $\omega_1$, the transmitter signal thus being frequency modulated at the audio frequency rate to give an output signal with components including $\omega$, $\omega+\omega_1$, and $\omega-\omega_1$. These signals pass into an R.F. limiter circuit 74 which serves to limit any undesired amplitude variations occurring in the transmitter 71 or modulator 72, since the receiver end of this system is sensitive to amplitude variations. Provided the transmitter 71 is stable so that amplitude fluctuations do not occur and the modulator does not introduce any AM components, the limiter 74 may be omitted. The audio frequency should be large compared to the line spacings in a spectra and small compared to the bandpass of the R.F. amplifier and limiter in this system. For example, an audio frequency of two kilocycles may be selected as illustrative. The frequency modulated signal is transmitted to the bridge circuit 75 including the R.F. coil 75' surrounding the sample being measured through a modulator circuit 76, for example, a single side band modulator, which receives a sweep signal for additionally modulating the signal to sweep through the spectrum at the frequency rate of the variable frequency sweep oscillator 77. The single side band modulation may also be placed in the modulation coil circuit in those systems utilizing polarizing field modulation such as in FIG. 1 if desired rather than the transmitter circuit. It should also be noted that in the above system the audio modulation field applied to the sample may be swept in frequency to produce the desired spectrum sweep.

By phase modulating the transmitter signal, the R.F. field of the transmitter coil expressed in complex form is $$h_1 \exp(i\omega t + i\beta \sin \omega_1 t) = h_1 \exp(i\omega t) \sum_{n=-\infty}^{\infty} J_n(\beta) \exp(in\omega_1 t)$$

where $\beta$ is the maximum change of phase angle produced by the modulator 72.

This system does not have the same restraint on the audio frequency value as does the system of FIG. 1, wherein the magnetic field $H_0$ is audio modulated. As the audio frequency $\omega_1$ used in the system of FIG. 1 increases, higher $H_m$ power is necessary since $$\beta = \frac{H_m}{\omega_1}$$

and this power demand limits the audio frequency to lower values than can be readily utilized in this frequency modulation system.

The values of the frequencies $\omega$ and $\omega_1$ and the strength of the field $H_0$ are so chosen that the nuclear resonance is made to occur in the sample at one of the side bands, for example, $n=1$.

In this case the magnetic field $H_0$ must be equal to $$\frac{\omega + \omega_1}{\gamma}$$

to produce resonance. The resonance signal in this case has only the frequency $\omega+\omega_1$. The R.F. field at this frequency has an amplitude of $h_1 J_1(\beta)$ and so the saturation parameter will be $s=\gamma^2 H_1^2 J_1^2(\beta) T_1 T_2$. The input to the R.F. amplifier 78 thus comprises the signal directly from the transmitter circuit, including the frequency components $\omega$, $\omega+\omega_1$, and $\omega-\omega_1$, and, at resonance, the signal $\omega+\omega_1$. The output of the R.F. amplifier 78 is fed to an R.F. detector 79. During the time no resonance signals are stimulated, there will be no output from the R.F. detector 79 since the detector is only sensitive to the amplitude changes of the R.F. voltage. However, in the presence of a resonance signal., an audio output at the frequency $\omega_1$ will occur at the output of the R.F. detector 79 since the incoming wave will now have some amplitude modulation. The audio signal is amplified in audio amplifier 81 and is converted into a D.C. signal in the audio mixer 82. Either the $u$ or $v$ mode component may be selected by the choice of the phase, by means of phase shifter 83, of the audio reference voltage from the audio amplifier 73. The output from the audio mixer 82 is transmitted directly and also through an integrator 84 to a dual channel recorder 85 which receives its sweep drive from oscillator 77.

In the side band resonance oscillator system utilized in this embodiment, the output of the modulator 72 is coupled through the limiter 74 to the bridge circuit 80 including the R.F. coil 86 surrounding the oscillator substance in the magnetic field, the parameters of the radio frequency and magnetic field being chosen so that resonance occurs in the sample at one of the side band frequencies. The resonance signal is transmitted through the radio frequency amplifier 87 to the detector 88, the output of which is coupled to the audio amplifier 73 and through the feedback circuit to the frequency modulator 72. A discriminator 89 may also be used for control purposes as explained above.

Referring now to FIG. 6 there is shown another embodiment of the present invention including a side band resonance oscillator channel comprising radio frequency transmitter 91, attenuator circuit 92, the probe including transmitter coil 93, pick-up coil 94 and gyromagnetic substance 95, R.F. amplifier 96, R.F. mixer 97, audio amplifier 98, compensation circuit 99, and field modulator coil 101. The sample measurement channel comprises the transmitter 91, attenuator 102, transmitter coil 103, pick-up coil 104, sample 105, R.F. amplifier 106, R.F. mixer 107, audio amplifier 108, audio mixer 109, and an indicating means such as, for example, an oscilloscope 110. It is noted that in this embodiment the audio or low frequency modulation for side band operation is applied to both substances 95 and 105 by a single modulation coil 101 and this technique could also be employed in the system of FIG. 1, if desired. In addition, the slow sweep signal utilized to sweep through the spectrum is applied from the sweep unit 111 via sweep coil 112 to the side band oscillator channel of the system as distinguished from the other sweep methods described above. A discriminator 113 is utilized for magnet field control.

In all of the above systems, the gyromagnetic ratio of the oscillator substance is the same as that of the sample under analysis, for example, both containing protons or both containing fluorine. In FIG. 7, there is shown an embodiment in which the two substances may be different, for example, one proton and the other fluorine. In this instance, a frequency synthesizer circuit 113' is utilized in association with a sweep oscillator 114 and with a correction signal from the side band oscillator output to produce a frequency signal synchronized with but of a different frequency than the transmitter frequency. For example, the transmitter signal may be approximately 60 megacycles for protons in the side band oscillator channel which includes the R.F. transmitter 115, R.F. coil 116 surrounding the substance 117, R.F. amplifier 118, R.F. detector 119, audio amplifier 120, compensation circuit 121, and modulator coil 122. The output of the frequency synthesizer may be approximately 56 megacycles for fluorine in the measurement channel which includes the transmitter 115, frequency synthesizer circuit 113', R.F. coil 123 surrounding the substance 124, R.F. amplifier 125, R.F. detector 126 and the phase detector 127 leading to the indicating circuits. In such a case, concentric samples may be employed including samples with similar atom portions separated by large chemical shifts. Also, a single mixed sample may be utilized for both the oscillator and measuring channels.

Referring to FIG. 8, there is shown a spectrometer system of the general type disclosed in the various above embodiments which also incorporates a method of automatically sweeping across a line of the spectrometer sample to permit optimizing the magnetic field adjustments before making a sample run. A sweep circuit 128 including sweep coil 128' is closed through switch 131' to provide a small, low frequency sweep signal, for example, a signal with an amplitude comparable to a linewidth and a frequency of about 3 c.p.s., to the sample in the measuring channel probe 129, the sweep signal also being transmitted as a reference signal to a phase detector 130 coupled to the output of the audio amplifier and phase detector 129' of the measurement channel. The output of the phase detector 130 is transmitted to a bias coil 132 to control the strength of the polarizing field $H_0$ at probe #1 relative to the field at probe #2 to retain the line of the spectrum in the region of the small sweep. The magnetic field may then be adjusted as by electric current shims or magnet benders or the like until the highest voltage reading is obtained on the D.C. voltmeter 130', the bias system retaining the line centered during such field adjustments. The side band oscillator in this system comprises the radio frequency transmitter 132', the oscillator probe 133 which includes the oscillator sample, the radio frequency amplifier 134, detector 135, the audio amplifier 136, the compensation circuit 137, and the modulation coil 138 utilized to modulate the field at both probes. The measurement channel includes the radio frequency transmitter 132', the measurement channel probe 129, the radio frequency amplifier 131, the detector circuit 139, the audio phase detector 129' leading to the indicator circuitry 139', and the low or audio frequency sweep circuit 140. In this embodiment, the bias coil 132 also doubles as the spectrometer sweep coil.

Referring now to FIG. 9, there is shown a spectrometer system of a more conventional type utilizing a side band oscillator for controlling the transmitter in accordance with the oscillator output. The side band oscillator channel of this system includes the transmitter circuit 141 coupled to the radio frequency coil 142 surrounding the oscillator sample 143 through an attenuator circuit 144, pick-up coil 144', the radio frequency amplifier 145, an R.F. phase detector 146, an audio amplifier 147, the field modulator circuit 148 and the field modulation coil 149 coupled to the oscillator substance 143. The measurement channel of this system includes the transmitter 141, attenuator 151, the radio frequency coil 152 surrounding the sample 153, pick-up coil 153', the radio frequency amplifier 154, R.F. phase detector 155, and the indicating system including the recorder 159 and integrator 160. A sweep of the resonance signal is provided by the sweep circuit 162 and magnetic field sweep coil 163. A discriminator 164 is coupled to the output of the audio amplifier and is utilized to control the frequency of the transmitter by means of, for example, a variable reactor to thereby stabilize the system. Rather than controlling the transmitter, of course, it is possible to control the strength of the magnetic field such as shown in FIG. 4.

The system shown in FIG. 10 is designed for utilization when the nuclei of the control sample are different than the nuclei of the spectrometer channel, for example, protons and fluorine, respectively. Separate transmitters 161 and 162 at the proper Larmor frequencies, for example, approximately 60 mc. for the protons and 56 mc. for the fluorine, are utilized in the two channels. The control channel includes the attenuator 163, R.F. coil 164, R.F. amplifier 165, diode detector 166, audio amplifier 167, compensation condenser 168, and modulation coil 169 for modulating the $H_0$ field at both samples. The spectrometer channel includes the attenuator 170, crossed R.F. coils 171, R.F. amplifier 172, diode detector 173, audio amplifier 174, audio phase detector 175 and associated phase reference amplifier 176, and indicators 177.

Operation of this system is very similar to operation of the system shown in FIG. 1 and described above. In the present system, however, the slow sweep generator 178 feeds two sweep coils 179 and 180 which serve to sweep the field $H_0$ at both samples. The coils are arranged such that the field is swept in opposite directions at the two samples, in push-pull fashion, to thereby give an increased sweep rate. The discriminator 181 provides an error signal which is fed to the variable reactor circuits 182 and 183 associated with the two channel transmitters 161 and 162, respectively, to control the frequency outputs. The attenuator 184 is provided when desired to compensate for the fact that frequency changes will be different for the two channels.

Referring to FIG. 11, another form of system suitable for use wtih samples having different gyromagnetic ratios is shown. This system is somewhat similar to the system of FIG. 10 and like elements bear like reference numerals primed. Rather than controlling the transmitters 161' and 162', the output signal from the discriminator 181', is utilized to control the field at the spectrometer channel sample by means of compensation coil 185. In lieu of the compensation coil 185 or in addition thereto, a magnetic field flux stabilizer 186 could be utilized to control the magnetic field. Such a flux stabilizer is shown in U.S. Patent 2,930,966, issued March 9, 1960 to W. Bell and M. Packard. The discriminator output may be coupled to the galvanometer coil 187 of the flux stabilizer, the output of the stabilizer being coupled to the associated field coil 188. In lieu of the discriminator 181' for controlling the compensation coil 185 and/or flux stabilizer 186, a phase lock system comprising audio mixer 189 and associated oscillator 190 could be employed by opening the break contacts of switch 180 and closing the make contacts thereof. The transmitters in this application must be highly stable.

FIG. 12 illustrates a modification that may be made in FIG. 11 to convert it to a system using a common R.F. transmitter 161'. Only the transmitter end of the system is shown. The R.F. signal for the spectrometer channel is obtained from a radio frequency oscillator 191 and multiplier 192. The output of the R.F. oscillator 191 is also transmitted to a second multiplier 193 and thence to a mixer 194 where the multiplier signal is beat with the radio frequency from the transmitter 161' to give a difference frequency. This difference frequency is transmitted through a filter and amplifier 195 to a mixer 196 which receives a reference signal from an audio oscillator 197. The output from the mixer 196 is a D.C. signal which passes through a filter 198 to a variable reactor to control the frequency of the radio frequency oscillator 191. Assume that the frequency to attenuator 170' is to be 55 mc. and that to attenuator 163' is 60.1 mc. The R.F. oscillator 191 may be 5 mc. which is multiplied 11 times by multiplier 192 to 55 mc. Multiplier #2 increases the signal to the mixer 194 12 times to 60 mc. The output of mixer 194 is .1 mc. and it is mixed in mixer 196 with a .1 mc. signal from oscillator 197. The R.F. oscillator frequency is thus automatically controlled to maintain the proper relationship between the two driving radio frequencies.

The system shown in FIG. 13 illustrates the fact that the one channel, for example, the control channel, may employ frequency modulation while the other channel, for example, the spectrometer channel, may employ magnetic field modulation, or vice versa. This system is very similar to the system shown in FIG. 5 and like elements bear like reference numerals primed. The difference lies in the fact that the output of the limiter 74' is not utilized as the driving radio frequency for the spectrometer channel. Rather, the transmitter output, with sweep modulation, is used as the spectrometer driving R.F. signal and the low frequency modulation of the spectrometer channel is produced by the magnetic field modulation coil 199 coupled to the output of the audio amplifier 73'. It is, of course, apparent that in the other described embodiments the two different channels may employ different types of low frequency modulation when desirable.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Gyromagnetic resonance apparatus including a measurement channel and an oscillator channel, said measurement channel adapted to contain a first gyromagnetic substance and said oscillator channel adapted to contain a second gyromagnetic substance, means for producing a unidirectional magnetic field for polarizing said substances, means for applying driving radio frequency magnetic fields to said substances at an angle to said polarizing magnetic field to produce gyromagnetic resonance in said substances, means for modulating one of said polarizing or radio frequency magnetic fields applied to each of said two substances at a periodic low frequency rate to produce radio frequency side band resonance signals from the substances, the parameters of the polarizing and radio frequency fields at each substance being so selected that resonance at one of the side band frequencies is produced in each substance, means in said measurement channel for detecting the resonance condition in said first substance, said oscillator channel including circuit means for supplying the low frequency modulation signal to said polarizing or radio frequency magnetic fields, said low frequency modulation producing the sideband resonance signals from the substances, said circuit means including means for detecting said side band resonance signal in said second substance to produce an output signal at said low frequency rate for use by said circuit means as said low frequency modulation signal.

2. Gyromagnetic resonance apparatus as claimed in claim 1 including means for sweeping one of said radio frequency or polarizing magnetic fields at one of said substances to thereby sweep through the resonance in said measurement channel substance.

3. Gyromagnetic resonance apparatus as claimed in claim 1 wherein said means for modulating one of said fields at each substance comprises means for modulating said polarizing magnetic field at said low frequency rate.

4. Gyromagnetic resonance apparatus as claimed in claim 3 including means for sweeping one of said radio frequency or polarizing magnetic fields at one of said substances to thereby sweep through the resonance in said measurement channel substance.

5. Gyromagnetic resonance apparatus as claimed in claim 3 wherein said means for modulating said polarizing magnetic field includes at least one modulation coil coupled to said oscillator channel circuit means and positioned in said polarizing magnetic field.

6. Gyromagnetic resonance apparatus as claimed in claim 1 wherein said means for modulating one of said fields at each substance comprises means for modulating said radio frequency magnetic fields.

7. Gyromagnetic resonance apparatus as claimed in claim 6 including means for sweeping one of said radio frequency or polarizing magnetic fields at one of said substances to thereby sweep through the resonance in said measurement channel substance.

8. Gyromagnetic resonance apparatus as claimed in claim 6 wherein said means for modulating said radio frequency magnetic fields includes amplitude modulator means in said radio frequency field applying means.

9. Gyromagnetic resonance apparatus as claimed in claim 6 wherein said means for modulating said radio frequency fields includes frequency modulator means in said radio frequency field applying means.

10. Gyromagnetic resonance apparatus as claimed in claim 1 including means responsive to said oscillator channel output signal for controlling at least one of said polarizing or radio frequency magnetic fields applied to said measurement channel substance.

11. Gyromagnetic resonance apparatus as claimed in claim 10 wherein said means responsive to said oscillator channel output signal controls the strength of said polarizing magnetic field.

12. Gyromagnetic resonance apparatus as claimed in claim 10 wherein said means responsive to said oscillator channel output signal controls the frequency of said radio frequency magnetic field.

13. Gyromagnetic resonance apparatus as claimed in claim 10 wherein said last means includes means for converting frequency changes in said low frequency output signal into control signal amplitude changes for use in controlling said fields.

14. Gyromagnetic resonance apparatus as claimed in claim 10 including means for sweeping one of said radio frequency or polarizing magnetic fields at one of said substances to thereby sweep through the resonance in said measurement channel substance.

15. Gyromagnetic resonance apparatus as claimed in claim 1 having means for at times converting said measurement channel into an oscillator channel comprising means in said detecting means in said first channel for detecting the side band resonance signal in said first substance to produce an output signal at said low frequency rate, and means for at times coupling said side band signal detecting means to said means for modulating one of said polarizing or radio frequency magnetic fields applied to said first substance so as to provide said low frequency modulation signal to produce the radio frequency side band resonance signals from said first substance.

16. Gyromagnetic resonance apparatus including a measurement channel and an oscillator channel, said measurement channel adapted to contain a first gyromagnetic substance and said oscillator channel adapted to contain a second gyromagnetic substance, means for producing a unidirectional magnetic field for polarizing said substances, means for applying driving radio frequency magnetic fields to said substances at an angle to said polarizing magnetic field to produce gyromagnetic resonance in said substances, means for modulating said polarizing magnetic field applied to said two substances at a periodic low frequency rate to produce radio frequency side band resonance signals from the substances, the parameters of the polarizing and radio frequency fields at each substance being so selected that resonance at one of the side band frequencies is produced in each substance, means in said measurement channel for detecting the resonance condition in said first substance, said oscillator channel including circuit means for supplying the low frequency modulation signal to said polarizing magnetic field, said low frequency modulation producing the side band resonance signals from the substances, said circuit means including means for detecting said side band resonance signal in said second substance to produce an output signal at said low frequency rate for use by said circuit means as said low frequency modulation signal, and means responsive to said oscillator channel output signal for controlling at least one of said polarizing or radio frequency magnetic fields applied to said measurement channel substance.

17. Gyromagnetic resonance apparatus as claimed in claim 16 wherein said means responsive to said oscillator channel output signal controls the strength of said polarizing magnetic field.

18. Gyromagnetic resonance apparatus as claimed in claim 16 wherein said means responsive to said oscillator channel output signal controls the frequency of said radio frequency magnetic field.

19. Gyromagnetic resonance apparatus as claimed in claim 16 including means for sweeping said polarizing magnetic field at one of said substances to thereby sweep through the resonance in said measurement channel substance.

20. Gyromagnetic resonance apparatus including a measurement channel and an oscillator channel, said measurement channel adapted to contain a first gyromagnetic substance having one gyromagnetic ratio and said oscillator channel adapted to contain a second gyromagnetic substance having a gyromagnetic ratio different than said first substance, means for producing a unidirectional magnetic field for polarizing said substances, means for applying driving radio frequency magnetic fields to said substances at their respective Larmor frequencies and at an angle to said polarizing magnetic field to produce gyromagnetic resonance in said substances, means for modulating one of said polarizing or radio frequency magnetic fields applied to each of said two substances at a periodic low frequency rate to produce radio frequency side band resonance signals from the substances, the parameters of the polarizing and radio frequency fields at each substance being so selected that resonance at one of the side band frequencies is produced in each substance, means in said measurement channel for detecting the resonance condition in said first substance, said oscillator channel including circuit means for supplying the low frequency modulation signal to said polarizing or radio frequency magnetic fields, said low frequency modulation producing the side band resonance signals from the substances, said circuit means including means for detecting said side band resonance signal in said second substance to produce an output signal at said low frequency rate for use by said circuit means as said low frequency modulation signal.

21. Gyromagnetic resonance apparatus as claimed in claim 20 wherein said means for modulating one of said fields comprises means for modulating said polarizing magnetic field at said low frequency rate.

22. The method of stabilizing a gyromagnetic resonance apparatus having a measurement channel and an oscillator channel, said measurement channel including a first gyromagnetic substance and said oscillator channel including a second gyromagnetic substance, including the steps of producing a unidirectional magnetic field for polarizing said substances, applying driving radio frequency magnetic fields to said substances at an angle to said polarizing magnetic field to produce gyromagnetic resonance in said substances, modulating one of said polarizing or radio frequency magnetic fields applied to said two substances at a low frequency rate to produce radio frequency side band resonance signals from the substances, the parameters of the polarizing and radio frequency fields being so selected that resonance at one of the side band frequencies is produced, detecting the resonance condition in said first substance, and detecting the resonance condition in said second substance and producing an output signal at said low frequency rate therefrom, said low frequency output signal being utilized as the modulating signal for modulating said one field.

23. The method as claimed in claim 22 wherein said step of modulating one of said fields comprises modulating said polarizing magnetic field at said low frequency rate.

24. The method as claimed in claim 22 wherein said step of modulating one of said fields comprises modulating said radio frequency magnetic field.

25. The method as claimed in claim 24 wherein said step of modulating said radio frequency magnetic field comprises amplitude modulating said radio frequency field.

26. The method as claimed in claim 24 wherein said step of modulating said radio frequency field comprises frequency modulating said radio frequency field.

27. The method as claimed in claim 22 including the step of controlling at least one of said polarizing or radio frequency magnetic fields applied to said measurement channel substance in response to changes in said oscillator channel output signal.

28. The method as claimed in claim 27 wherein said last step comprises controlling the strength of said polarizing magnetic field.

29. The method as claimed in claim 27 wherein said last step comprises controlling the frequency of said radio frequency magnetic field.

30. The method as claimed in claim 22 comprising the step of at times converting said measurement channel into an oscillator channel by detecting the side band resonance signal in said first substance to produce an output signal at said low frequency rate, and modulating one of said polarizing or radio frequency magnetic fields applied to said first substance with said output signal to produce the radio frequency side band resonance signals from said first substance.

31. Gyromagnetic resonance apparatus including a measurement channel and an oscillator channel, said measurement channel adapted to contain a first gyromagnetic substance and said oscillator channel adapted to contain a second gyromagnetic substance, means for producing a unidirectional magnetic field for polarizing said substances, means for applying driving radio frequency magnetic fields to said substances at an angle to said polarizing magnetic field to produce gyromagnetic resonance in said substances, means in said measurement channel for detecting the resonance condition in said first substance, means for modulating one of said radio frequency or polarizing magnetic fields applied to said oscillator channel substance at a low frequency rate to produce a radio frequency side band resonance signal from said substance, the parameters of the polarizing and radio frequency field at said oscillator channel substance being so selected that resonance at one of the side band frequencies is produced, said oscillator channel including circuit means for supplying the low frequency modulation signal to said radio frequency or polarizing magnetic field at said oscillator channel substance, said low frequency modulation producing the side band resonance signals from the substance, said circuit means including means for detecting said side band resonance signal in said oscillator channel substance to produce an output signal at said low frequency rate for use as said low frequency modulation signal, and means responsive to said oscillator channel output signal for controlling at least one of said polarizing or radio frequency magnetic fields applied to said measurement channel substance.

References Cited in the file of this patent

UNITED STATES PATENTS 3,085,195 Anderson _____ Apr. 9, 1963

OTHER REFERENCES

Baker et al.—The Review of Scientific Instruments—vol. 28, No. 5, May 1957—pages 313 to 321 incl., (Q–184–R5).

Freeman et al.—The Review of Scientific Instruments—vol. 31, No. 2, February 1960—pages 103 to 106 incl., (Q–184–R5).